US012589352B2

(12) United States Patent
Schneider et al.

(10) Patent No.: US 12,589,352 B2
(45) Date of Patent: Mar. 31, 2026

(54) COMPRESSED AIR STATION

(71) Applicant: Kaeser Kompressoren SE, Coburg (DE)

(72) Inventors: Phil Andre Schneider, Coburg (DE); Klaus-Ulrich Kobelt, Coburg (DE)

(73) Assignee: KAESER KOMPRESSOREN SE, Coburg (DE)

( * ) Notice: Subject to any disclaimer, the term of this patent is extended or adjusted under 35 U.S.C. 154(b) by 870 days.

(21) Appl. No.: 17/598,571

(22) PCT Filed: Mar. 24, 2020

(86) PCT No.: PCT/EP2020/058080
§ 371 (c)(1),
(2) Date: Sep. 27, 2021

(87) PCT Pub. No.: WO2020/200904
PCT Pub. Date: Oct. 8, 2020

(65) Prior Publication Data
US 2023/0249125 A1     Aug. 10, 2023
US 2025/0170523 A9     May 29, 2025

(30) Foreign Application Priority Data

Mar. 29, 2019     (EP) ..................................... 19166237

(51) Int. Cl.
B01D 53/26          (2006.01)
F04D 27/00          (2006.01)

(52) U.S. Cl.
CPC .......... B01D 53/265 (2013.01); F04D 27/004 (2013.01); Y02B 30/70 (2013.01)

(58) Field of Classification Search
CPC .. F04D 15/0066; F04D 25/166; F04D 19/007; F04D 27/04; F04D 29/5806; F04D 29/5826; B01D 53/265; Y02B 30/70
See application file for complete search history.

(56) References Cited

U.S. PATENT DOCUMENTS

| | | | | |
|---|---|---|---|---|
| 2004/0244393 A1* | 12/2004 | Lucas | ................. | F04D 29/5826 62/470 |
| 2010/0232980 A1 | 9/2010 | Tanaka et al. | | |
| 2017/0097198 A1* | 4/2017 | Lamberson | ............... | F28B 9/06 |

FOREIGN PATENT DOCUMENTS

| | | | |
|---|---|---|---|
| DE | 102014000541 A1 | 7/2015 | |
| DE | 102015012462 B3 * | 3/2017 | .............. F24F 11/77 |
| JP | H03178314 A | 8/1991 | |

(Continued)

OTHER PUBLICATIONS

DE_102015012462_B3 translation (Year: 2015).*

(Continued)

*Primary Examiner* — Elizabeth J Martin
(74) *Attorney, Agent, or Firm* — Myers Bigel, P.A.

(57) ABSTRACT

A compressed air station includes at least two compressed air components that yield waste heat. Each compressed air component is designed either as a compressor, in particular as a screw compressor, or as a refrigeration dryer. The compressed air station includes at least one exhaust air duct for discharging waste heat from a room, and at least one of the compressed air components, namely a refrigeration dryer, is connected to the exhaust air duct, and a further compressed air component is connected to the same exhaust air duct.

14 Claims, 7 Drawing Sheets

(56)          References Cited

FOREIGN PATENT DOCUMENTS

| | | | |
|---|---|---|---|
| JP | H07189912 A | 7/1995 | |
| WO | WO-2018113275 A1 * | 6/2018 | ............. F04C 29/00 |

OTHER PUBLICATIONS

WO_2018113275_A1 translation (Year: 2018).*
Chinese Office Action corresponding to CN App. No. 2020800258498;
Dated: Sep. 6, 2023 (16 pages, including English translation).

* cited by examiner

COMPRESSED AIR STATION

The invention relates to a compressed air station comprising at least two compressed air components that yield waste heat, wherein each compressed air component is designed either as a compressor, in particular as a screw compressor, or as a refrigeration dryer, and at least one exhaust air duct for discharging waste heat from a room.

A compressed air refrigeration heat exchanger is provided within the refrigeration dryer, in which the compressed air is cooled by way of a refrigerant conducted in a refrigerant circuit, wherein the refrigerant circuit comprises a refrigerant compressor, a condenser, an expansion valve and the compressed air refrigeration heat exchanger.

The waste heat produced by the compressor(s) is traditionally already discharged via one or more exhaust air ducts from a plant room in which the compressed air components are installed. In the case of refrigeration dryers, which usually produce a smaller amount of waste heat compared to the compressors present within a compressed air station, the waste heat has traditionally been either introduced into the plant room or conducted away via extraction hoods arranged above the refrigeration dryers. However, particularly when discharging the waste heat from the refrigeration dryer(s) into the plant room or even when this is conducted away only incompletely via an extraction hood arranged above the refrigeration dryer, the problem arises that the ambient air in the plant room heats up and the efficiency both of the compressors, in particular the screw compressors, and of the refrigeration dryers decreases.

In contrast, the object of the present invention is to propose a compressed air station and a corresponding method in which an improved discharging of waste heat from a plant room is made possible, including the waste heat from a refrigeration dryer present in the compressed air station.

This object is achieved in terms of the device by a compressed air station having the features of claim 1 and in terms of the method by a method for actuating a speed-adjustable fan motor of a fan of a refrigeration dryer according to the features of claim 9. Advantageous further developments are specified in the dependent claims.

In terms of the device, the compressed air station is characterized in that it further comprises a dryer exhaust air duct, which is provided for discharging from the refrigeration dryer a cooling air flow that is conducted through the refrigeration dryer, and which connects a cooling air outlet of the refrigeration dryer to a refrigeration dryer connection on the exhaust air duct, wherein the refrigeration dryer has a fan with a speed-adjustable fan motor, and the fan is designed to convey the cooling air flow even against a backpressure currently prevailing in the exhaust air duct, wherein the refrigeration dryer has a controller or interacts with a controller, which is configured and designed to actuate the fan motor of the fan in such a way that the fan compensates for the backpressure prevailing in the exhaust air duct, so that a volume transported by the cooling air flow per unit of time remains unchanged.

In terms of the method, it is proposed that the fan motor of a fan of a refrigeration dryer within a compressed air station is actuated in order to compensate for even a fluctuating backpressure within an exhaust air duct, which is also fed by at least one further compressed air component, the method being designed as follows:

A method for actuating a speed-adjustable fan motor of a fan of a refrigeration dryer within a compressed air station, wherein the compressed air station comprises at least two compressed air components that yield waste heat, wherein each compressed air component is designed either as a compressor, in particular as a screw compressor, or as a refrigeration dryer, and at least one exhaust air duct for discharging waste heat from a room, wherein a compressed air refrigeration heat exchanger is provided within the refrigeration dryer, in which the compressed air is cooled by way of a refrigerant conducted in a refrigerant circuit, wherein the refrigerant circuit comprises a refrigerant compressor, a condenser, an expansion valve and the compressed air refrigeration heat exchanger, wherein the compressed air station further comprises a dryer exhaust air duct, which is provided for discharging from the refrigeration dryer a cooling air flow that is conducted through the refrigeration dryer, and which connects a cooling air outlet of the refrigeration dryer to a refrigeration dryer connection on the exhaust air duct, wherein the refrigeration dryer has a fan with a speed-adjustable fan motor, and the fan is designed to convey the cooling air flow even against a backpressure currently prevailing in the exhaust air duct, wherein the refrigeration dryer has a controller or interacts with a controller, which actuates the fan motor of the fan in such a way that the fan compensates for the backpressure prevailing in the exhaust air duct, so that a volume transported by the cooling air flow per unit of time remains unchanged.

In a preferred embodiment, the method according to the invention further comprises the following steps:

reading in a value representative of the current condensation pressure currently prevailing within the condenser, calculating a current condensation temperature from the value of the current condensation pressure, reading in a value representative of the temperature of the supply air, which defines a supply air temperature, calculating a setpoint for the condensation temperature in defined dependence on the supply air temperature, and actuating the fan motor of the fan in such a way that the current condensation temperature follows the setpoint for the condensation temperature.

One core consideration of the present invention is that of controlling the fan motor of the fan in the refrigeration dryer in such a way that a residual pressure of the exhaust air flow from the refrigeration dryer is adjusted to the pressure level of an exhaust air duct system used jointly with at least one further compressed air component. The speed of the fan motor of the fan is therefore varied such that the amount of exhaust air from the refrigeration dryer per unit of time, i.e. the cooling air volume flow of the refrigeration dryer, remains unchanged regardless of the current backpressure in the exhaust air duct.

The condensation pressure of the refrigeration dryer, and thus the cooling capacity of the refrigeration dryer, can thus be kept at the same level regardless of the current backpressure, wherein it remains possible for the condensation pressure or the cooling capacity to vary according to other criteria, but the current backpressure in the exhaust air duct or in the exhaust air duct system has no influence on the condensation pressure or the cooling capacity of the refrigeration dryer. A current residual pressure will be understood here to mean the current pressure reserve of the fan for overcoming additional flow resistances, such as that of an exhaust air duct for example. The maximum achievable residual pressure of the fan used in the refrigeration dryer is to be regarded as sufficient if the backpressure, as results from the interaction with other components, such as a connected screw compressor, and the additional flow resistances, as occur inter alia in an exhaust air duct of customary length, can be overcome.

Although, with regard to the refrigerant circuit, mention is made of a condenser on the one hand and an expansion valve on the other hand, it is clarified that the refrigerant circuit need not necessarily be operated with a phase transition of gas-liquid liquid-gas, but rather in the case of certain refrigerants is also operated via transcritical processes, such as for example in the case of $CO_2$ (R-744). There is then no liquefaction, but rather heat is output on the high-pressure side of the refrigerant circuit and the gas phase is retained. The gas cooler outlet temperature is then to be seen as a value equivalent to the condensation temperature.

A speed-adjustable fan motor in the sense of the invention will be understood to be a fan motor that can be adjusted with regard to its speed, in particular by frequency reversal or by phase control.

In the present application, the cooling air flow conducted through the refrigeration dryer is referred to as the cooling air flow per se. Where the cooling air volume flow is mentioned, this refers to the quantitative value as a volume flow, for example expressed in the unit $m^3$/s, i.e. the volume of cooling air transported by the cooling air flow per period of time.

In a preferred embodiment, the refrigeration dryer has a pressure sensor for detecting a value representative of the current condensation pressure $p_{c,act}$ within the condenser. In this case, the refrigeration dryer has a controller or interacts with a controller, which is configured and designed to record and process the data from the pressure sensor and to actuate the fan motor of the fan by adjusting the condensation pressure to a setpoint pressure for the condensation pressure $p_{c,soll}$ in such a way that a volume transported by the cooling air volume flow per unit of time remains unchanged, regardless of the current backpressure in the exhaust air duct.

As a supplement or in addition to detecting the current condensation pressure $P_c$, it would also be within the sense of the present invention to detect the outlet temperature of the refrigerant from the condenser or from the gas cooler, since the condensation temperature directly correlates with the condensation pressure and thus the two values can be converted into one another.

In a further preferred embodiment, it is provided that a screw compressor and the refrigeration dryer are connected to one another via a compressed air line, and the compressed air line is designed to transfer the compressed air output by the screw compressor to the refrigeration dryer for drying purposes, wherein a cooling air outlet of the screw compressor is connected via a compressor connection to the exhaust air duct, to which the refrigeration dryer is also connected. In this possible embodiment, the screw compressor and the refrigeration dryer convey their waste heat via corresponding cooling air outlets to the same exhaust air duct. At the same time, the compressed air output by the screw compressor is transferred to the refrigeration dryer for drying purposes. However, it is also conceivable that, although the compressed air generated by the screw compressor is transferred to the refrigeration dryer, the screw compressor and the refrigeration dryer output their waste heat to different exhaust air ducts.

In a preferred embodiment of the compressed air station proposed here, the controller interacts with an ambient air sensor, preferably a temperature sensor, for detecting a value representative of the state of the supply air, in particular a value representative of the supply air temperature, and transmitting it to the controller.

In a further preferred embodiment, the fan of the refrigeration dryer is designed as a radial fan. Admittedly, traditionally used axial fans have a lower power consumption at the nominal point and thus initially appear more favourable from an energy point of view. However, this applies particularly in connection with traditionally used refrigeration dryers, which blow out their waste heat directly into a plant room in which they are installed. Radial fans appear more suitable for direct connection to an exhaust air duct or to an exhaust air duct system since they are able to ensure a higher residual pressure.

In the compressed air station proposed here, one or more oil-injected screw compressors and/or one or more oil-free compressors may be used.

In a possible embodiment of the present invention, two or more screw compressors and/or two or more refrigeration dryers are connected to a common exhaust air duct. Particularly large pressure fluctuations or pressure differences may occur in a common exhaust air duct used in this way, and therefore an adjustment of the fan motor of the fan of the refrigeration dryer, as proposed in the context of the present invention, appears to be advantageous.

In a preferred embodiment, an exhaust air damper is arranged in the dryer exhaust air duct, which damper is designed and configured to close the dryer exhaust air duct when the refrigerant compressor is idle. This prevents the exhaust air from flowing back into a plant room in which the refrigeration dryer is installed.

In this case, in a preferred embodiment, the exhaust air damper may be designed as a gravity-operated exhaust air damper, which opens whenever the fan is conveying the cooling air flow through the dryer exhaust air duct and closes whenever the fan is idle.

In an alternatively possible embodiment, the exhaust air damper may interact with a drive motor, wherein the drive motor is actuated by the controller in such a way that the exhaust air damper is opened or closed depending on the operating state of the fan. In particular, the exhaust air damper is or will be opened when the fan is operating. The exhaust air damper is or will be closed in particular when the fan is idle.

The method according to the invention for actuating the fan, as already specified further above, is characterized inter alia in that the refrigeration dryer has a fan with a speed-adjustable fan motor, and the fan is designed to convey the cooling air flow even against a backpressure currently prevailing in the exhaust air duct, wherein the refrigeration dryer has a controller or interacts with a controller, which actuates the fan motor of the fan in such a way that the fan compensates for the backpressure prevailing in the exhaust air duct.

In a preferred further development of the present method, it is provided that the current condensation pressure is converted into a current condensation temperature $T_{c,\ act}$, and the fan is actuated in such a way that the current condensation temperature $T_{c,\ act}$ follows a setpoint for the condensation temperature $T_{c,\ soll}$, wherein this setpoint for the condensation temperature $T_{c,\ soll}$ is in defined dependence on the supply air temperature $T_{amb}$, i.e. account is also taken of the actual conditions as regards the temperature of the cooling air conducted via the refrigeration dryer for cooling purposes.

In a specific further development of the proposed method, for calculating the setpoint for the condensation temperature $T_{c,\,soll}$ in the case of supply air temperatures below a limit temperature $T_{0,\,amb}$, a dryer-specific, constant minimum temperature is defined as the setpoint for the condensation temperature $T_{c,\,soll}$. Such a constant minimum temperature $T_{fix}$ for the condensation temperature $T_{c,\,soll}$ may be, for example, 25° C. Defining a minimum temperature such as this has proven useful for maintaining a certain minimum condensation pressure, which in turn appears useful for a defined process in the refrigerant circuit, in particular with regard to a certain minimum pressure gradient at the expansion valve.

In a further advantageous embodiment of the present method, the setpoint for the condensation temperature $T_{c,\,soll}$ in the case of temperatures above a limit temperature $T_{0,\,amb}$ results from the supply air temperature $T_{amb}$ with a dryer-specific supplement $\Delta T$. Such a dryer-specific supplement may be, for example, 10° C., depending on the design and efficiency of the condenser. If the heat of the supply air is transferred particularly well to the condenser, the dryer-specific supplement $\Delta T$ is lower; if, on the other hand, the efficiency of the heat transfer is not as good, a higher supplement $\Delta T$ will be chosen.

In a particularly advantageous embodiment, the setpoint for the condensation temperature $T_{c,\,soll}$ results from the following formula $$T_{c,\,soll} = \max[T_{amb} + \Delta T \text{ or } T_{fix}],$$

where $T_{amb}$ denotes the supply air temperature, $\Delta T$ denotes a dryer-specific supplement, and $T_{fix}$ denotes a dryer-specific, constant minimum temperature.

In a possible embodiment of the present method, a PID controller, a PI controller, a deadband controller or a three-point controller is used to actuate the drive motor of the fan in order to bring $T_{c,\,act}$ towards $T_{c,\,soll}$, wherein a control deviation e results from $T_{c,\,soll} - T_{c,\,act}$, and wherein $T_{c,\,soll}$ denotes the setpoint for the condensation temperature and $T_{c,\,act}$ denotes the current condensation temperature.

The invention will be explained in greater detail below, including with regard to further features and advantages, based on the description of exemplary embodiments and with reference to the following drawings, in which.

Figure 1:
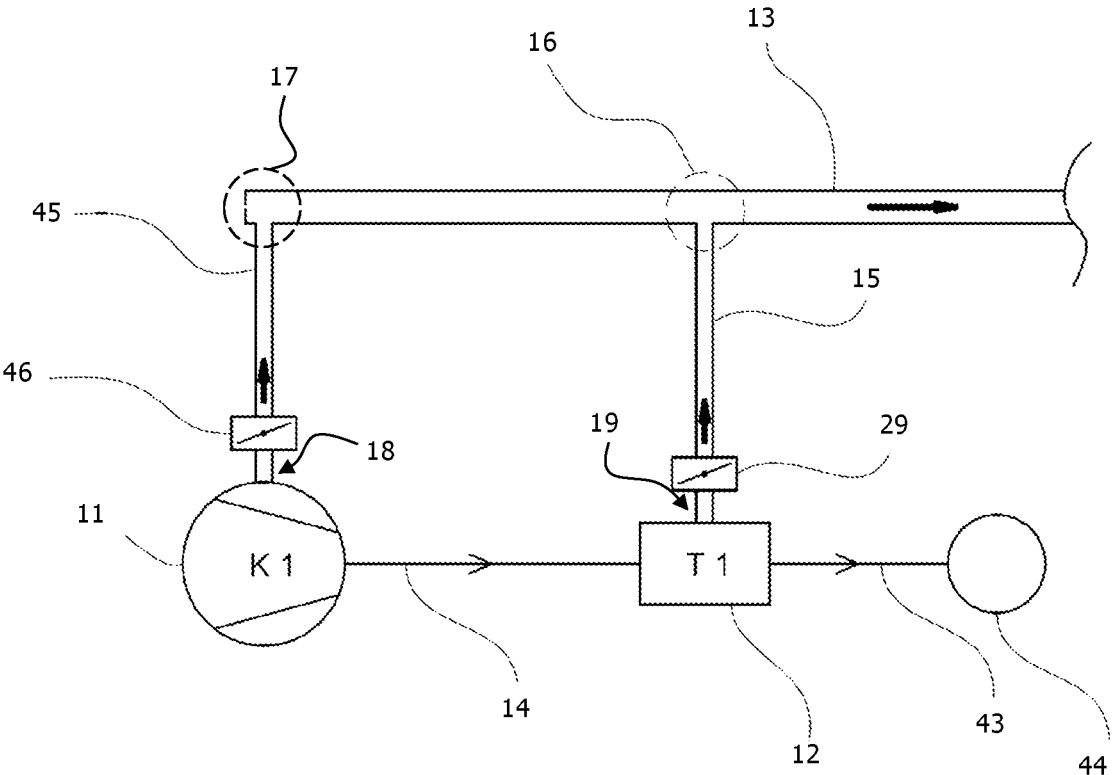
FIG. 1 shows an exemplary embodiment of a compressed air station according to the invention, in a schematic illustration.

FIG. 1 shows an exemplary embodiment of a compressed air station according to the invention, in which, as compressed air components, a screw compressor 11 and a refrigeration dryer 12 are connected to a common exhaust air duct 13. The screw compressor 11 supplies compressed air via a compressed air line 14 to the refrigeration dryer 12.

Via a further compressed air line 43, the compressed air dried in the refrigeration dryer 12 is supplied to a consumer 44. Instead of one consumer, a plurality, in particular a large number, of consumers may also be supplied with compressed air through the further compressed air line 43 via a compressed air network.

The screw compressor 11 and the refrigeration dryer 12 produce waste heat, which according to the invention is discharged via the common exhaust air duct 13 by way of corresponding cooling air flows. A screw compressor exhaust air duct 45 forms the first section of a common exhaust air duct 13, to which the refrigeration dryer 12 is also connected further downstream via a dryer exhaust air duct 15. Specifically, the screw compressor 11 has a cooling air outlet 18, to which the screw compressor exhaust air duct 45 is directly connected. The refrigeration dryer 12 likewise has a cooling air outlet 19, to which the dryer exhaust air duct 15 is directly connected, namely preferably in such a way that only the cooling air or the waste heat of the refrigeration dryer 12 is discharged and no mixing takes place with ambient air not conducted via the refrigeration dryer 12.

The dryer exhaust air duct 15 is connected to the common exhaust air duct 13 at the aforementioned refrigeration dryer connection 16. In addition, an exhaust air damper 29 is arranged between the refrigeration dryer 12 and the refrigeration dryer connection 16 on the exhaust air duct 13, in particular within the dryer exhaust air duct 15, by means of which damper the dryer exhaust air duct 15 can be closed.

A further exhaust air damper 46 may also be arranged between the screw compressor 11, i.e. between the cooling air outlet 18 of the screw compressor 11 and the refrigeration dryer connection 16, in particular within the screw compressor exhaust air duct 45. As passive backflow dampers, the exhaust air damper 29 of the refrigeration dryer and/or the exhaust air damper 46 of the screw compressor can either be opened using a sufficient flow in the conveying direction or closed under the effect of gravity. However, it is also possible (see illustration in FIG. 6) to open and close the exhaust air damper 29 by means of a drive motor 39. Of course, the exhaust air damper 46 of the screw compressor can also be opened and closed by means of a drive motor (not shown).

Figure 2:
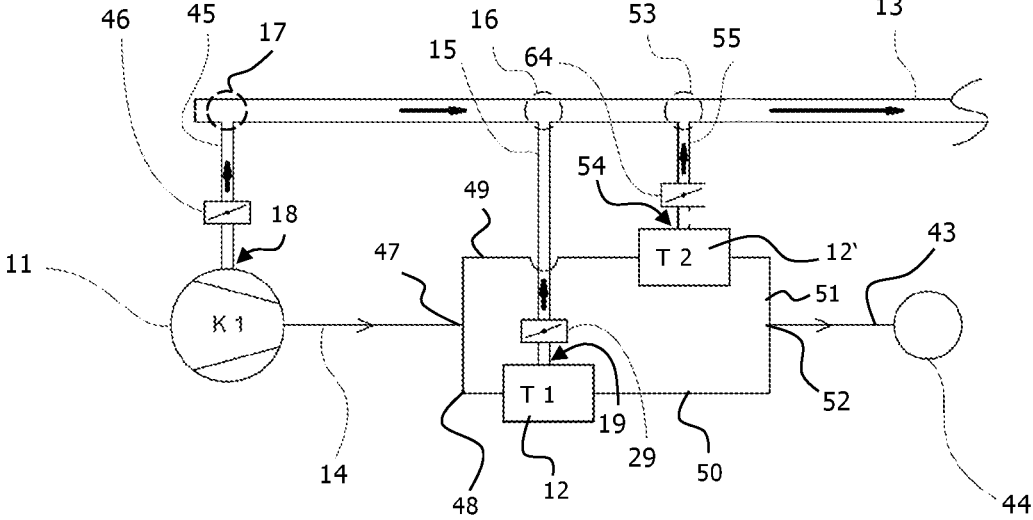
FIG. 2 shows an embodiment of a compressed air station according to the invention, modified in comparison to the embodiment shown in FIG. 1, in a schematic illustration.

FIG. 2 shows an embodiment of a compressed air station according to the invention, modified in comparison to the embodiment shown in FIG. 1, in which, as compressed air components, a screw compressor 11 and a first refrigeration dryer 12 and also a further refrigeration dryer 12' are connected to a common exhaust air duct 13. In this embodiment, the compressed air transferred from the screw compressor to the compressed air line 14 is split at a branching point 47 into a first partial line 48 and a second partial line 49.

The first refrigeration dryer 12 is arranged in the first partial line 48, and the second refrigeration dryer 12' is arranged in the second partial line 49. The dried compressed air leaves the first refrigeration dryer 12 via a third partial line 50. The dried compressed air that flows via the second partial line 49 into the second refrigeration dryer 12' and is dried therein leaves the refrigeration dryer 12' via a fourth partial line 51. The third partial line 50 and the fourth partial line 51 are brought together at a joining point 52 and merge into the compressed air line 43, which conducts the compressed air to at least one consumer 44.

The screw compressor 11, the refrigeration dryer 12 and the refrigeration dryer 12' each direct their cooling air flows into a common exhaust air duct 13. To this end, the screw compressor 11 is connected to the exhaust air duct 13 in the manner already described with reference to the embodiment shown in FIG. 1. The first refrigeration dryer 12 is also connected to the common exhaust air duct 13, in the manner already described with reference to the embodiment shown in FIG. 1, in order to transfer the cooling air or waste heat output from the cooling air outlet 19. Downstream of the refrigeration dryer connection 16, which is assigned to the first refrigeration dryer 12, a second refrigeration dryer connection 53 is provided on the exhaust air duct 13, at which the cooling air of the second refrigeration dryer 12' is also introduced downstream into the exhaust air duct 13. To this end, a cooling air outlet 54 of the second refrigeration dryer is connected to a dryer exhaust air duct 55, which connects the cooling air outlet 54 of the second refrigeration dryer 12' to the refrigeration dryer connection 53 on the exhaust air duct 13, so that the cooling air also of the second refrigeration dryer is discharged without any ambient air not conducted via the second refrigeration dryer 12'. Also in this dryer exhaust air duct assigned to the second refrigeration dryer 12', an exhaust air damper 64 is provided so as to be able to close the exhaust air duct 55, in particular when the second refrigeration dryer 12' is idle.

Figure 3:
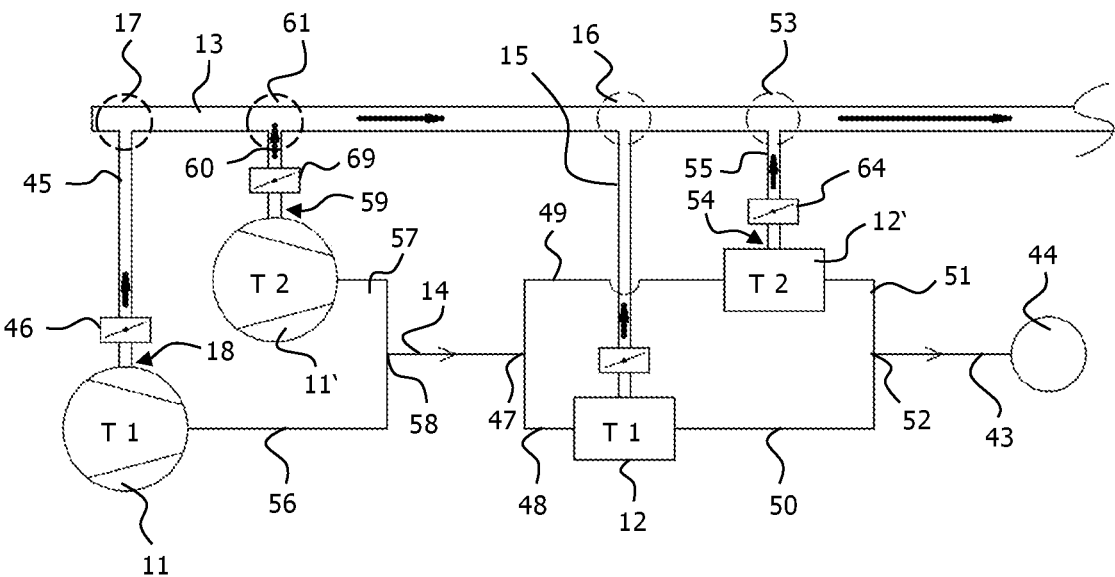
FIG. 3 shows an embodiment of a compressed air station, once again modified in comparison to FIGS. 1 and 2, in a schematic illustration.

FIG. 3 shows an embodiment of a compressed air station, once again modified in comparison to the embodiments shown in FIG. 1 and FIG. 2, in which, as compressed air components, a first screw compressor 11, a second screw compressor 11', a first refrigeration dryer 12 and a second refrigeration dryer 12' are connected to a common exhaust air duct 13. In the embodiment of a compressed air station illustrated in FIG. 3, two screw compressors are provided, namely the first screw compressor 11 and the second screw compressor 11', which operate in parallel with one another with regard to compressed air generation, i.e. the screw compressor 11 outputs compressed air on a first output line 56 and the screw compressor 11' outputs compressed air on a second output line 57. At a joining point 58, the first output line 56 and the second output line 57 join to form a common compressed air line 14. From the compressed air line 14, the compressed air is conducted at a branching point 47 to a first partial line 48 and to a second partial line 49, in which a respective refrigeration dryer 12 or 12' is connected. The compressed air is thus dried by the two refrigeration dryers 12, 12' in parallel, so that the arrangement of the two refrigeration dryers corresponds exactly to the arrangement of the two refrigeration dryers according to the embodiment shown in FIG. 2. The discharging of the cooling air or waste heat via dryer exhaust air duct 15 or dryer exhaust air duct 55 also takes place exactly as in the arrangement shown in FIG. 2.

In manner differing from the arrangement shown in FIG. 2, however, in the embodiment shown in FIG. 3 not only are two refrigeration dryers 12, 12' connected to the common exhaust air duct 13, but also the aforementioned two screw compressors 11, 11'. The first screw compressor 11 is connected to the common exhaust air duct 13 in the manner already described with reference to FIGS. 1 and 2 and represents the component yielding waste heat that is arranged furthest upstream in relation to the flow direction of the exhaust air duct 13. The screw compressor 11 is therefore the waste heat supplier placed most upstream within the common exhaust air duct 13.

The aforementioned second screw compressor 11' has a cooling air outlet 59, by which it is connected to a screw compressor exhaust air duct 60. Arranged within the screw compressor exhaust air duct 60 is an exhaust air damper 69, by which the screw compressor exhaust air duct 60 can be closed. The screw compressor exhaust air duct 60 connects the cooling air outlet 59 of the second screw compressor 11' to a compressor connection 61, at which the crew compressor exhaust air duct 60 is connected to the common exhaust air duct 13, namely at a section between the compressor connection 17 of the first screw compressor 11 and the refrigeration dryer connection 16 of the first refrigeration dryer 12 or the second refrigeration dryer connection 53 of the refrigeration dryer 12'.

Figure 4:
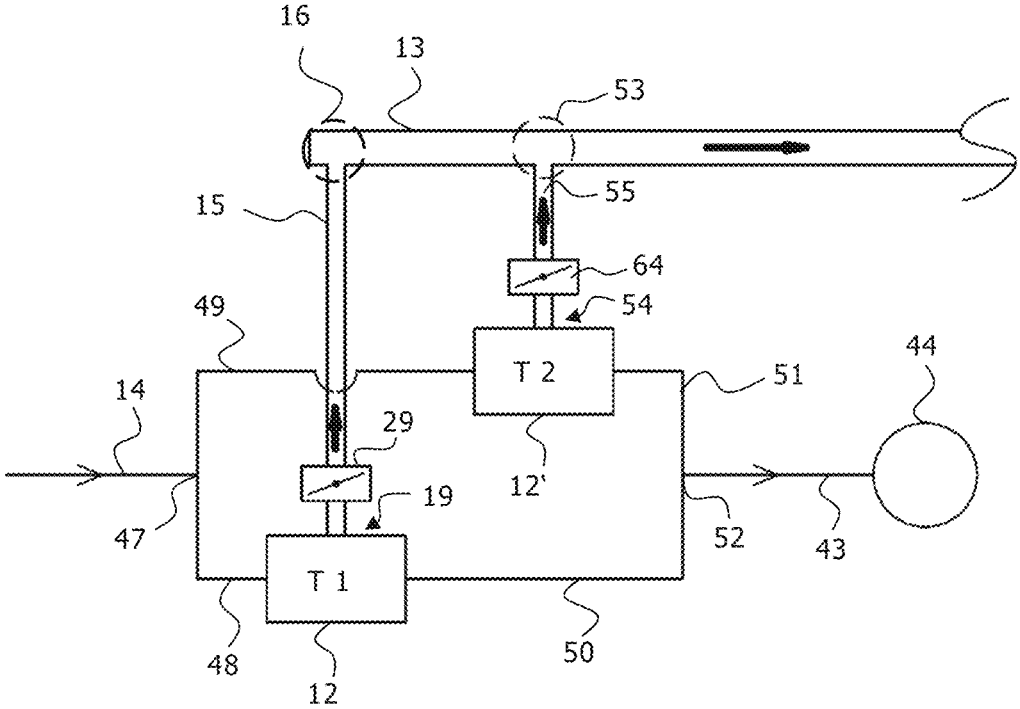
FIG. 4 shows an embodiment of a compressed air station, once again modified in comparison to FIGS. 1 to 3, in a schematic illustration.

FIG. 4 illustrates an embodiment that has once again been modified, in which, as compressed air components, a first refrigeration dryer 12 and a second refrigeration dryer 12' are connected to a common exhaust air duct 13. In this case, therefore, a common exhaust air duct 13 is not fed by one refrigeration dryer 12 and one screw compressor 11, but rather by two refrigeration dryers 12, 12'. The connection of the refrigeration dryers 12, 12' corresponds to the connection of the refrigeration dryers 12, 12' in the arrangement of the embodiment shown in FIG. 3, with the sole exception that no cooling air or waste heat from a screw compressor 11, 11' is introduced upstream of the connection points where the refrigeration dryers 12, 12' are connected to the common exhaust air duct 13.

Figure 5:
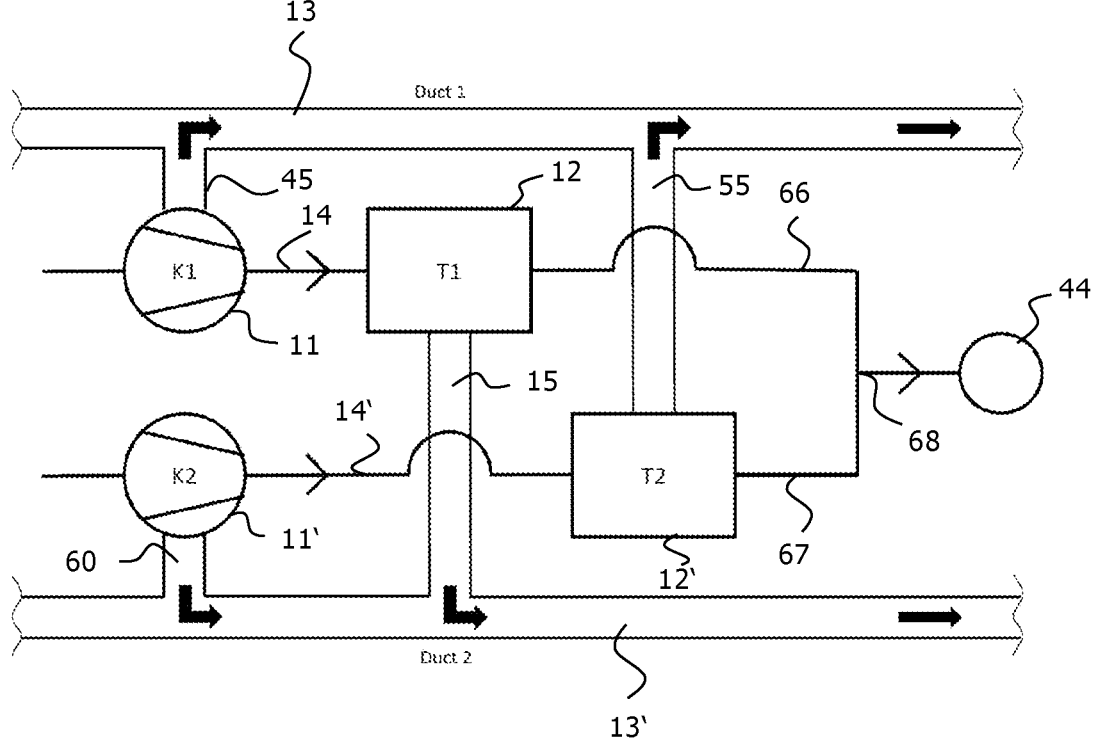
FIG. 5 shows an embodiment of a compressed air station, once again modified in comparison to FIGS. 1 to 4, in a schematic illustration.

FIG. 5 illustrates an embodiment that has once again been modified, in which, as compressed air components, a first screw compressor 11 discharges waste heat into a first exhaust air duct 13 via a screw compressor exhaust air duct 45. The screw compressor 11 supplies compressed air via a compressed air line 14 to a first refrigeration dryer 12. The compressed air dried in the refrigeration dryer 12 is conducted via a first output line 66 to a joining point 68, to which compressed air dried in a second refrigeration dryer 12' is also conducted via a second output line 67. From the joining point 68, the combined dried compressed air is fed to a consumer 44.

A second screw compressor 11' generates compressed air and transfers this compressed air via the compressed air line 14' to the aforementioned second refrigeration dryer 12'. Waste heat from the second screw compressor 11' is supplied via a screw compressor exhaust air duct 60 to a second exhaust air duct 13', which is separate from the exhaust air duct 13. Waste heat from the first refrigeration dryer 12 is also discharged into this second exhaust air duct 13' via a dryer exhaust air duct 15. The second refrigeration dryer 12', which in terms of compressed air is connected to the second screw compressor 11', in contrast feeds its exhaust air via a dryer exhaust air duct 55 to the exhaust air duct 13, which is also fed by the first screw compressor 11. Here, therefore, the pairs of screw compressors and refrigeration dryers connected one behind the other are connected to two different exhaust air ducts 13, 13' in a crossed fashion. Also in the embodiment shown in FIG. 5, the screw compressor exhaust air duct 45, the screw compressor exhaust air duct 60, the dryer exhaust air duct 15 and/or the dryer exhaust air duct 55 may each have exhaust air dampers 46, 69, 29, 64, but these are not shown in FIG. 5.

Figure 6:
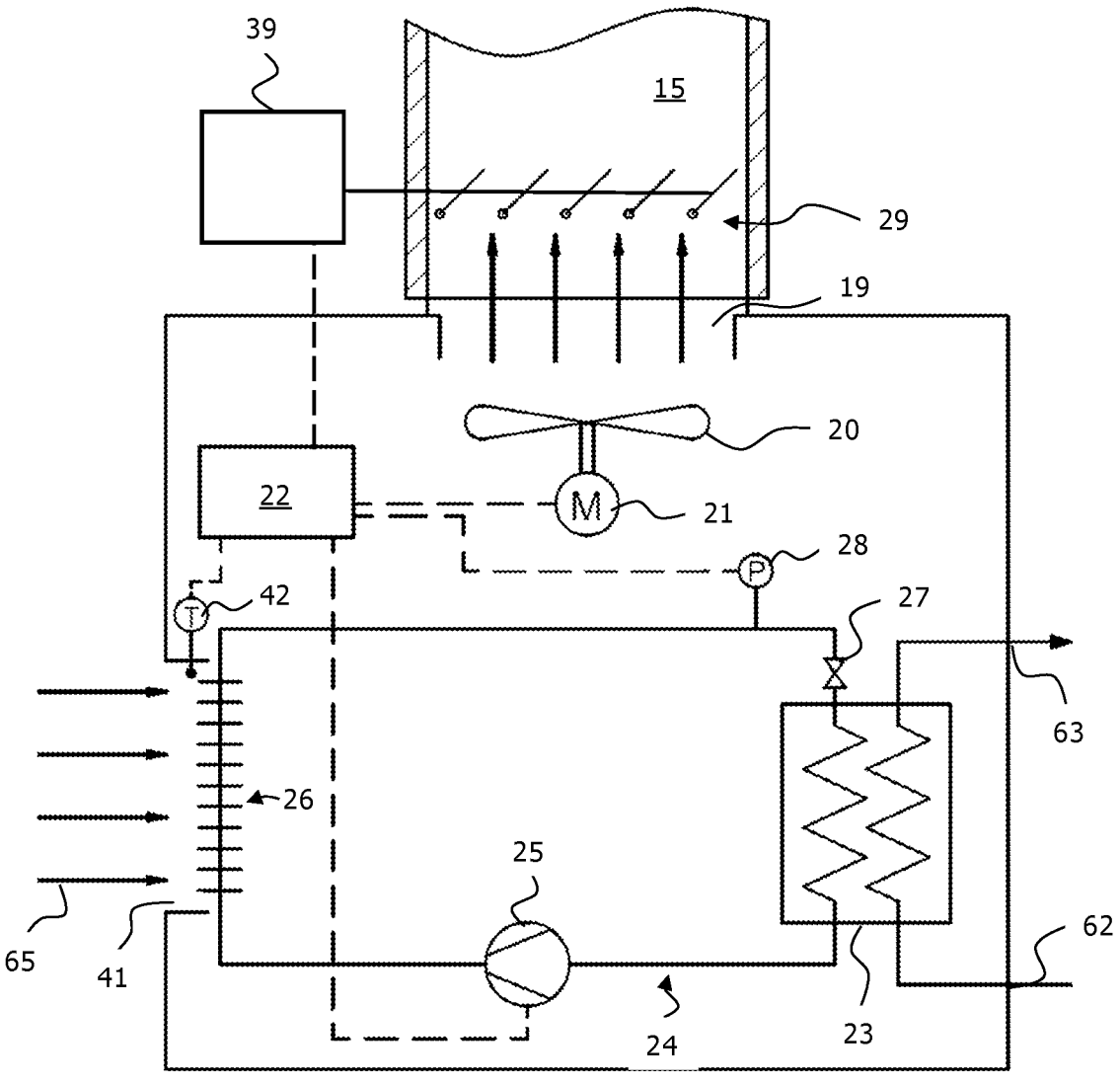
FIG. 6 shows a schematic illustration to explain the mode of operation of a refrigeration dryer according to the present invention.

The basic structure and the basic mode of operation of a refrigeration dryer 12, 12' according to the present invention will be explained in greater detail below with reference to FIG. 6. The refrigeration dryer first has a compressed air inlet 62 and a compressed air outlet 63. The compressed air flowing into the refrigeration dryer 12, 12' via the compressed air inlet 62 is cooled by a refrigerant at a compressed air refrigeration heat exchanger 23 and leaves the refrigeration dryer through the compressed air outlet 63. As is well known to a person skilled in the art, prior to flowing into the compressed air refrigeration heat exchanger 23, the compressed air is usually pre-cooled in a pre-heat exchanger, namely by the compressed air that has already flowed through the compressed air refrigeration heat exchanger 23, which is thus heated again before flowing out of the compressed air outlet 63. However, the pre-heat exchanger described above is not shown in the present case.

To provide the cooling capacity required at the compressed air refrigeration heat exchanger 23, the latter is part of a refrigerant circuit 24, which forms a compression refrigeration machine, known per se, and thus comprises, as seen in the direction of flow of the refrigerant from the compressed air refrigerant heat exchanger 23 a refrigerant compressor 25, a condenser 26 connected thereto and an expansion valve 27 downstream thereof. The gas expanded after flowing through the expansion valve 27 is cooled by the expansion process and in the compressed air refrigerant heat exchanger 23 absorbs heat from the compressed air. The refrigerant compressor 25 compresses the refrigerant. The heat produced during this is output in the condenser 26 to the supply air. For this purpose, a cooling air flow 65 is conducted through the refrigeration dryer 12, 12', the supply air usually being ambient air and being sucked into the refrigeration dryer 12, 12' at a supply air inlet 41, namely under the effect of a fan 20 driven by a fan motor 21.

The cooling air flow 65 absorbs heat in the condenser 26, so that the refrigerant in the condenser 26 is cooled. According to the invention, the resulting waste heat is to be introduced via a dryer exhaust air duct 15 to an exhaust air duct 13, into which waste heat from other compressed air-generating or compressed air-processing components is also conducted. For this purpose, the dryer exhaust air duct 15 is connected directly to the cooling air outlet 19 of the refrigeration dryer 12, 12'. An exhaust air damper 29, which can be moved by way of a drive motor 39, in particular from an open position to a closed position or vice versa, interacts with a controller 22, which actuates the exhaust air damper 29 and closes or opens it as required.

However, the controller 22 also controls the fan motor 21 of the fan 20. The fan motor 21 is speed-adjustable here, so that the controller 22 can precisely specify the respectively required power of the fan. Specifically, the speed of the fan motor 21 of the fan 20 is varied such that the amount of exhaust air from the refrigeration dryer 12, 12' remains unchanged, regardless of the current backpressure in the exhaust air duct 13. As a result, the condensation pressure of the refrigerant in the condenser 26 can be kept at the same level, regardless of the current backpressure in the exhaust air duct 13. The cooling capacity is thus likewise kept constant in accordance with the constant pressure dew point. However, it of course remains possible for the condensation pressure or cooling capacity to vary according to other criteria. What matters is that the current backpressure in the exhaust air duct 13 has no influence on the condensation pressure or the cooling capacity in the condenser 26 of the refrigerant in the refrigerant circuit 24. By keeping the condensation pressure or the cooling capacity of the refrigeration dryer constant, the pressure dew point for the compressed air is also kept at a constant value.

To detect the current condensation pressure $p_{c,\ act}$, the pressure of the refrigerant in the condenser 26 or in the line between the condenser 26 and the expansion valve 27, in which substantially identical pressure conditions prevail, is detected by a pressure sensor 28. The values from the pressure sensor 28 are transmitted to the controller 22, which suitably adjusts the drive power of the fan motor 21. In a preferred embodiment, the refrigeration dryer 12, 12' may also have a temperature sensor 42, preferably in the region of the supply air inlet, for detecting a temperature of the ambient air or a temperature of the supply air.

Figure 7:
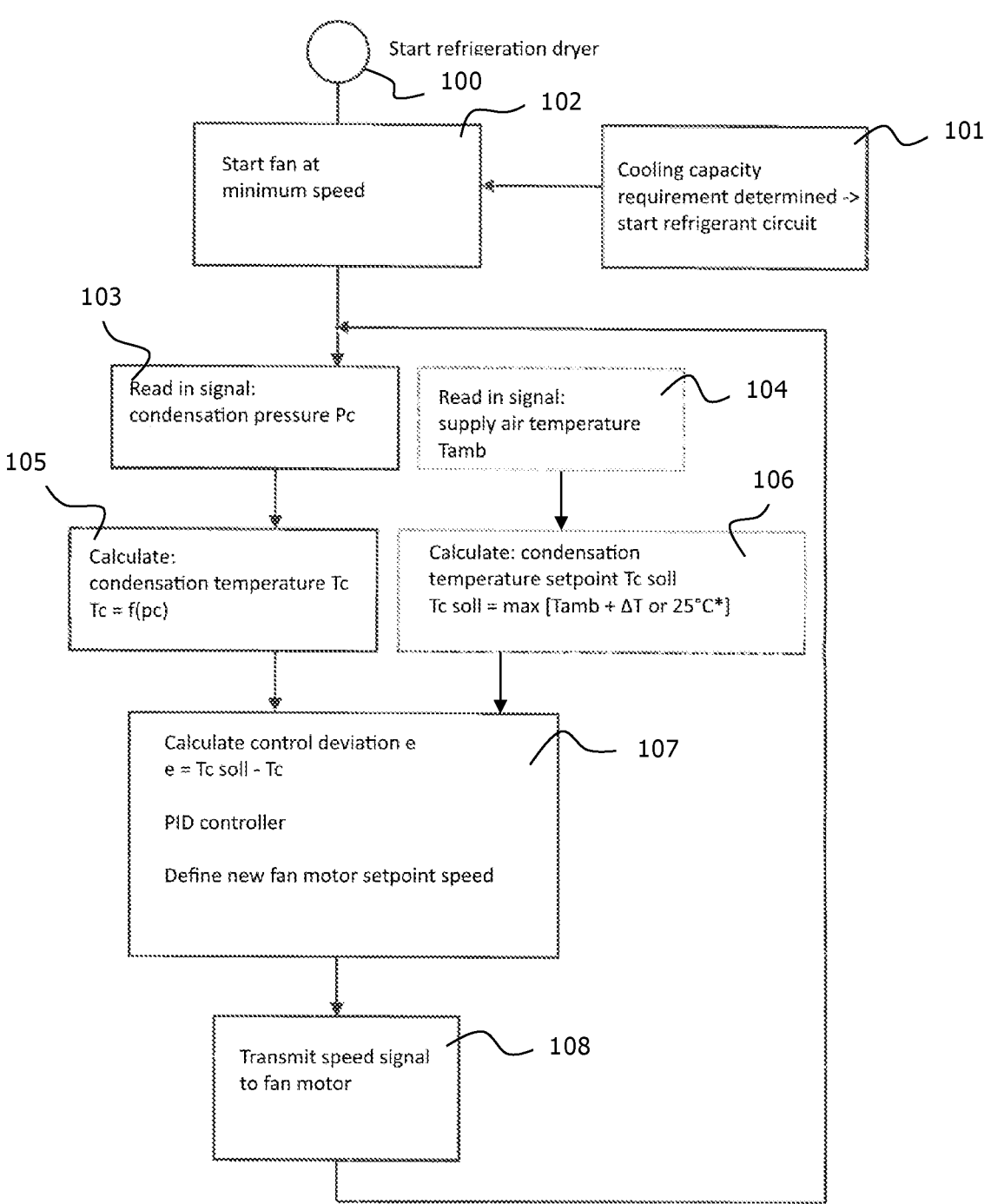
FIG. 7 shows a flowchart to explain an embodiment of the method according to the invention.

A preferred adjustment, taking into account the current condensation pressure and preferably also taking into account the supply air temperature $T_{amb}$, will be explained in greater detail below with reference to the flowchart shown in FIG. 7: In a step 100, the refrigeration dryer 12, 12' is first started. In a step 101, the cooling capacity requirement is determined and the refrigerant circuit 24 is started by setting the refrigerant compressor 25 in operation. In step 102, the fan 20 is started at a specified minimum speed. Then, in step 103, the current condensation pressure $p_{c,\ act}$ in the condenser 26 or in the adjoining line between the condenser 26 and the expansion valve 27 is determined, and the value thus determined is read into the controller 22. Furthermore, in a step 104, the supply air temperature $T_{amb}$ is detected, and the value is read into the controller 22. In a step 105, a current condensation temperature $T_{c,\ act}$ is calculated from the current condensation pressure $p_{c,\ act}$. In a step 106, a setpoint for the condensation temperature is calculated according to the following formula:

$$T_{c,\ soll} = \max[T_{amb} + \Delta T \text{ or } 25° \text{ C.}],$$

where $T_{amb}$ is the supply air temperature and $\Delta T$ is a dryer-specific supplement. In the present exemplary embodiment, the value of 25° C. is specified as a dryer-specific, constant minimum temperature.

In step 107, a control deviation e is calculated from the difference between $T_{c,\ soll}$ and $T_{c,\ act}$, and the speed of the fan motor 21 is readjusted via a suitable controller, for example a PID controller, by first defining a new fan motor setpoint speed. In step 108, based on this new fan motor setpoint speed, a speed signal is sent by the controller 22 to the fan motor 21 of the fan 20. By way of example, the method then begins again at step 102 or step 103, at a predefined sampling rate of, for example, 100 ms.

REFERENCE SIGNS 11, 11' screw compressor
12, 12' refrigeration dryer
13, 13' exhaust air duct
14, 14' compressed air line
15 dryer exhaust air duct
16 refrigeration dryer connection
17 compressor connection
18 cooling air outlet (screw compressor)
19 cooling air outlet (refrigeration dryer)
20 fan
21 fan motor
22 controller
23 compressed air refrigeration heat exchanger
24 refrigerant circuit
25 refrigerant compressor
26 condenser
27 expansion valve
28 pressure sensor
29 exhaust air damper
39 drive motor
40 pressure sensor
41 supply air inlet
42 ambient air sensor/temperature sensor
43 further compressed air line
44 consumer
45 screw compressor exhaust air duct
46 exhaust air damper (screw compressor)
47 branching point

11

48 first partial line
49 second partial line
50 third partial line
51 fourth partial line
52 joining point
53 further refrigeration dryer connection
54 cooling air outlet
55 dryer exhaust air duct
56 first output line
57 second output line
58 joining point
59 cooling air outlet
60 screw compressor exhaust air duct
61 compressor connection
62 compressed air inlet
63 compressed air outlet
64 exhaust air damper
65 cooling air flow
66 first output line
67 second output line
68 joining point
69 exhaust air damper
$p_{c,\,act}$ current condensation pressure
$T_{c,\,act}$ current condensation temperature
$T_{amb}$ supply air temperature
$T_{c,\,soll}$ setpoint for the condensation temperature
$T_{fix}$ dryer-specific, constant minimum temperature
$T_{0,\,amb}$ limit temperature (supply air)
$\Delta T$ dryer-specific supplement

The invention claimed is:

1. A compressed air station comprising:
at least two compressed air components that yield waste heat, wherein each compressed air component is designed either as a screw compressor or as a refrigeration dryer, and
at least one first exhaust air duct for discharging waste heat from a room,
wherein at least one of the at least two compressed air components comprises the refrigeration dryer and is connected to the first exhaust air duct, and wherein the other one of the at least two compressed air components is connected to the first exhaust air duct,
wherein a compressed air refrigeration heat exchanger is provided within the refrigeration dryer, in which the compressed air is cooled by way of a refrigerant conducted in a refrigerant circuit, wherein the refrigerant circuit comprises a refrigerant compressor, a condenser, an expansion valve and the compressed air refrigeration heat exchanger,
wherein the compressed air station further comprises a second exhaust air duct comprising a dryer exhaust air duct, which is provided for discharging from the refrigeration dryer a cooling air flow that is conducted through the refrigeration dryer, and which connects a cooling air outlet of the refrigeration dryer to a refrigeration dryer connection on the first exhaust air duct,
wherein the refrigeration dryer has a fan with a speed-adjustable fan motor, and the fan is designed to convey the cooling air flow even against a backpressure currently prevailing in the first exhaust air duct,
and wherein the refrigeration dryer has a controller or interacts with a controller, which is configured and designed to actuate the speed-adjustable fan motor of the fan in such a way that the fan compensates for the backpressure prevailing in the first exhaust air duct, so that a volume transported by the cooling air flow per unit of time remains unchanged.

2. The compressed air station according to claim 1, wherein the refrigeration dryer has a pressure sensor for detecting a value representative of the current condensation pressure $p_{c,act}$ within the condenser, and in that the controller is configured and designed to record and process the data from the pressure sensor and to actuate the speed-adjustable fan motor of the fan accordingly by adjusting the condensation pressure $p_c$ or the condensation temperature $T_c$ to a setpoint pressure for the condensation pressure $p_{c,soll}$ or a setpoint temperature for the condensation temperature $T_{c,soll}$ such that a volume transported by the cooling air flow per unit of time remains unchanged, regardless of the current backpressure in the first exhaust air duct.

3. The compressed air station according to claim 1, wherein the screw compressor and the refrigeration dryer are connected to one another by a compressed air line, and the compressed air line is designed to transfer the compressed air output by the screw compressor to the refrigeration dryer for drying purposes, wherein a cooling air outlet of the screw compressor is connected by a compressor connection to the first exhaust air duct, to which the refrigeration dryer is also connected.

4. The compressed air station according to claim 1, wherein the fan of the refrigeration dryer is designed as a radial fan.

5. The compressed air station according to claim 1, wherein the controller interacts with an ambient air sensor comprising a temperature sensor for detecting a value representative of the state of the supply air comprising the supply air temperature, and transmitting the value to the controller.

6. The compressed air station according to claim 1, wherein an exhaust air damper is arranged in the dryer exhaust air duct, which damper is designed and configured to close the dryer exhaust air duct when the refrigerant compressor is idle.

7. The compressed air station according to claim 6, wherein the exhaust air damper is designed as a gravity-operated exhaust air damper, which opens whenever the fan is conveying the cooling air flow through the dryer exhaust air duct and closes whenever the fan is idle.

8. The compressed air station according to claim 6, wherein the exhaust air damper interacts with a drive motor, wherein the drive motor is actuated by the controller in such a way that the exhaust air damper is opened or closed depending on the operating state of the fan.

9. A method for actuating a speed-adjustable fan motor of a fan of a refrigeration dryer within a compressed air station, wherein the compressed air station comprises at least two compressed air components that yield waste heat, wherein each compressed air component is designed either as a screw compressor or as the refrigeration dryer, and at least one first exhaust air duct for discharging waste heat from a room, wherein at least one of the at least two compressed air components comprises the refrigeration dryer and is connected to the first exhaust air duct, and wherein another one of the at least two compressed air components is connected to the first exhaust air duct,
wherein a compressed air refrigeration heat exchanger is provided within the refrigeration dryer, in which the compressed air is cooled by way of a refrigerant conducted in a refrigerant circuit, wherein the refrigerant circuit comprises a refrigerant compressor, a condenser, an expansion valve and the compressed air refrigeration heat exchanger, wherein the compressed air station further comprises a second exhaust air duct comprising a dryer exhaust air duct, which is provided for discharging a cooling air flow that is conducted through the refrigeration dryer, and which connects a cooling air outlet of the refrigeration dryer to another refrigeration dryer connection on the first exhaust air duct, wherein the refrigeration dryer has a fan with a speed-adjustable fan motor, and the fan is designed to convey the cooling air flow even against a backpressure currently prevailing in the first exhaust air duct, and wherein the compressed air station comprising the refrigeration dryer, has a controller or interacts with a controller, which is configured and designed to actuate the speed-adjustable fan motor of the fan in such a way that the fan compensates for the backpressure prevailing in the first exhaust air duct, so that a volume transported by the cooling air flow per unit of time remains unchanged.

10. The method according to claim 9, wherein the method further comprises the following steps:

reading in a value representative of the current condensation pressure $p_{c,\ act}$ currently prevailing within the condenser, calculating a current condensation temperature $T_{c,\ act}$ from the value of the current condensation pressure $p_{c,\ act}$, reading in a value representative of the temperature of the supply air, which defines a supply air temperature $T_{amb}$, calculating a setpoint for the condensation temperature $T_{c,\ soll}$ in defined dependence on the supply air temperature $T_{amb}$, and actuating the fan motor of the fan in such a way that the current condensation temperature $T_{c,\ act}$ follows the setpoint for the condensation temperature $T_{c,\ soll}$.

11. The method according to claim 9, wherein for calculating the setpoint for the condensation temperature $T_{c,\ soll}$ in the case of supply air temperatures below a limit temperature $T_{0,\ amb}$, a dryer-specific, constant minimum temperature $T_{fix}$ is defined as the setpoint for the condensation temperature $T_{c,\ soll}$.

12. The method according to claim 9, wherein the setpoint for the condensation temperature $T_{c,\ soll}$ at supply air temperatures above a limit temperature $T_{0,\ amb}$ results from the supply air temperature $T_{amb}$ with a dryer-specific supplement $\Delta T$.

13. The method according to claim 9, wherein the setpoint for the condensation temperature $T_{c,\ soll}$ results from the following formula $$T_{c,\ soll} = \max[T_{amb} + \Delta T \text{ or } T_{fix}],$$

where $T_{amb}$ denotes the supply air temperature, $\Delta T$ denotes a dryer-specific supplement, and $T_{fix}$ denotes a dryer-specific, constant minimum temperature.

14. The method according to claim 9, wherein a PID controller, a PI controller, a deadband controller or a three-point controller is used to actuate the fan motor of the fan in order to bring $T_{c,\ act}$ towards $T_{c,\ soll}$, wherein a control deviation e results from $T_{c,\ soll} - T_{c,\ act}$, and wherein $T_{c,\ soll}$ denotes the setpoint for the condensation temperature and $T_{c,\ act}$ denotes the current condensation temperature.

\* \* \* \* \*